United States Patent Office 3,085,890
Patented Apr. 16, 1963

3,085,890
LEAFING ALUMINUM PAINT MANUFACTURE
Rolf Rolles, New Kensington, Pa., assignor to Aluminum Company of America, Pittsburgh, Pa., a corporation of Pennsylvania
No Drawing. Filed Dec. 3, 1958, Ser. No. 777,845
20 Claims. (Cl. 106—241)

This invention relates generally to the manufacture of paints and coating formulations and is more particularly addressed to the treatment of acidic vehicles employed in the manufacture of ready-mixed leafing aluminum paints and coating formulations.

It is a recognized fact that many vehicles employed in the manufacture of ready-mixed paints, and similar coating formulations, contain organic acids which prevent their use in admixture with leafing grade metallic pigments, such as leafing aluminum flakes, because of the leaf-destroying propensities of the acidic components of the vehicles. Probably the greatest offender in this respect is the widely growing class of synthetic alkyd resin vehicles, which, so far as metallic pigmentation is concerned, have only been capable of use in ready-mixed form in admixture with non-leafing grade metallic pigments. The synthetic alkyd resin vehicles, however, are not alone in this respect, oleoresinous varnish vehicles, esterified natural rosin and oil-free varnishes being further examples of vehicles exhibiting varying degrees of the organic acidity characteristic destructive of the leaf-producing property of leafing grade metallic pigments.

Leafing metallic pigments contemplated within the scope of this invention are in regular commercial manufacture by dry hammer mill or wet ball mill processes, the pigments in either case consisting essentially of flake-like particles having a leafing agent in the form of a fatty acid, such as stearic or palmitic acid, or mixtures thereof, associated with the surfaces of the flakes and imparting thereto the property of "leafing" or "floating," which identifies the characteristic formation in a paint film of a layer of metallic pigment immediately below and adjacent the exposed dried surface of the vehicle with which the pigment has been initially thoroughly mixed.

In respect of the organic acids which are destructive of leafing, it has been discovered that the dibasic acids are more destructive than the monobasic acids, and further, that the short chain acids are more destructive of leafing than the long chain acids, with leaf stability increasing with increasing chain lengths and increasing equivalent weight of the organic acids.

It is among the objects of the present invention to provide vehicles characterized by inclusions of organic acids, and treatment therefor, which permits their subsequent admixture with leafing grades of metallic pigments, particularly aluminum flakes provided with a surface coating of a leafing agent, in the manufacture of ready-mixed leafing metallic paints and similar coating formulations.

It is also an object of the invention to provide ready-mixed leafing type metallic paint and coating formulations incorporating leafing grade metallic pigments in an acidic vehicle modified to neutralize the leaf-destroying propensities of the vehicle.

These and other objects will be understood by those skilled in the art to which this invention is addressed on consideration of the following description.

The invention is basically predicated on the discovery that vehicles exhibiting acidic leaf-destroying properties on admixture with leafing grade metallic pigments, and defined or evaluated in terms of containing leaf-destroying organic acids, can be modified by additions thereto of one or more acid reactive amines selected for their ability to "tie-up" or otherwise neutralize the organic acids in the vehicles when measured in terms of preventing deleafing of leafing metallic pigments in admixture with such modified vehicles. The particular vehicles contemplated herein are those normally having acid numbers within the range 5 to 32, and the amines found to be preferred are definable in terms of at least one of the group consisting of tetraethylene pentamine, piperidine, ethylene diamine and 1.3 diamino propanol in that the named amines are reactive with the organic acids in the vehicles under consideration at temperatures as low as 25° C., or room temperature.

Typical examples of the organic acids common to the vehicles regularly manufactured and marketed, and found to be destructive of the leafing properties of leafing grade metallic flakes, are the mono- and poly-basic acids, benzoic, abietic, phthalic, isophthalic, fumaric, maleic and sebacic.

No attempt is made to explain the exact chemistry involved in the chemical reaction which accounts for neutralization of the organic acidic propensities or qualities of the vehicles destructive of leaf on admixture with leafing grade metallic pigments, but it has been established in an extensive test program that the addition of one or more of the above-stated amines to such vehicles, prior to the addition thereto of leafing grade metallic pigments, has opened an entirely new class of vehicles and ready-mixed leafing metallic paints, and similar coating formulations, which to date, in the case of leafing aluminum pigmentation, have exhibited a shelf life of more than eighteen months. In addition, the leafing type metallic coatings formulated in accordance with the invention have exhibited increased durability, particularly when applied to ferrous surfaces, when compared with unadjusted or unmodified leafing type metallic coatings, and have in many cases exhibited increased body or viscosity of the paints or coating formulations thus produced.

The actual amount of amine necessary to substantially neutralize the organic acids exhibited by a particular vehicle will vary, depending upon the acid number of the vehicle and the particular amine or combination of amines selected for addition thereto. In this regard, satisfactory results have been realized when the above-named amines, singly or in combination, are added to the organic acid-containing vehicles in amounts of 0.3 to 5 milligrams per acid number per gram of non-volatile matter in the organic acid-containing vehicle undergoing modification, and in no event should the total amount of added amine or amines exceed 5 milligrams per acid number per gram of the non-volatile matter in the vehicles.

Significant in the practice of the invention is the discovery that the above-named selected amines must be added to the organic acid-containing vehicles, as distinguished from any initial contact or admixture of the amines with the leafing metallic flakes, in which latter cases the named amines have been found to be destructive of the leafing agent on the surfaces of the individual metallic flakes. The organic acid-containing vehicles to which one or more of the amines of the invention have been added have exhibited immediate improvement, measured in terms of leaf retention of leafing metallic coating formulations made therewith. However, in some instances, depending on the composition of the organic acid-containing vehicle, and amine or amines added thereto, optimum results in leaf retention have been observed when the treated or modified vehicle has been allowed to stand at room temperature for at least thirty minutes before dispersing a leafing metallic pigment therein. Organic acid-containing vehicles, modified in accordance with the invention, and ready-mixed leafing aluminum paints formulated therewith, have exhibited excellent stability on storage in sealed containers of the same for periods of more than eighteen months at room temperature in a test program evaluating the invention.

As used in the specification and appended claims, the term "acid number," as applied to the organic acid-containing vehicles, is the number of milligrams of potassium hydroxide required to neutralize one gram of the non-volatile matter or solids forming a component part of the vehicle, as distinguished from the volatile content thereof.

Examples selected from the test program conducted to evaluate the modified vehicles, and leafing aluminum coating formulations made therefrom, are given herein as follows:

EXAMPLE I

A synthesized organic acid-containing vehicle was formulated by mixing 50 grams of a 50 percent by weight non-volatile soya alkyd resin, exhibiting an acid number of 16 and containing 36 percent phthalic anhydride (by weight of non-volatile matter), with 50 grams of volatile hydrocarbon, such as mineral spirits, to provide a 25 percent by weight non-volatile vehicle of suitable consistency for admixture with metallic flake pigments in the manufacture of commercially acceptable metallic coating formulations, such as paints.

The vehicle so prepared was divided into two 50 gram portions to one of which was added at room temperature 1 milligram per acid member per gram of non-volatile matter in the synthesized vehicle, or 200 milligrams of the amine tetraethylene pentamine, and in each portion 4 grams of leafing aluminum flakes were thereafter dispersed to provide an amine-modified and an unmodified metallic aluminum coating formulation.

Initial leafing determinations were conducted on both formulations before each was sealed in a separate container for shelf storage at room temperature. Additional leafing determinations were also conducted at the end of one month, one year and nineteen months.

Table I records the results of the leafing determinations:

*Table I*

| Aluminum Coating Formulation | Percent Leafing | | | |
|---|---|---|---|---|
| | Initial | One Month | One Year | Nineteen Months |
| Modified Vehicle | 62 | 58 | 73 | 58 |
| Unmodified Vehicle | 41 | 0 | 0 | 0 | from which it will be observed that the aluminum coating formulation made with the vehicle modified to include tetraethylene pentamine exhibited a leafing value of 58 percent at the end of nineteen months, whereas the coating formulation made with the unmodified vehicle registered zero leafing value at the end of one month shelf storage.

EXAMPLE II

A synthesized 8-gallon modified phenolic resin linseed oil varnish vehicle containing 50 percent non-volatile matter, and exhibiting an acid number of 14.3 was mixed with 50 grams of mineral spirits to provide a 25 percent by weight non-volatile vehicle of suitable consistency for admixture with metallic flake pigments in the manufacture of commercially acceptable metallic coating formulations, such as paints.

The vehicle so prepared was divided into two 50 gram portions to one of which was added at room temperature 1.12 milligrams per acid number per gram of non-volatile matter in the synthesized vehicle or 200 milligrams, of the amine piperidine, and in each portion of the vehicle 4 grams of leafing aluminum flakes were thereafter dispersed to provide an amine-modified and an unmodified aluminum coating formulation.

Initial leafing determinations were conducted on both coating formulations before each was sealed in separate containers for shelf storage at room temperature. Additional leafing determinations were also conducted at the end of one month, and one year.

Table II records the results of the leafing determinations:

*Table II*

| Aluminum Coating Formulation | Percent Leafing | | |
|---|---|---|---|
| | Initial | One Month | One Year |
| Modified Vehicle | 73 | 73 | 72 |
| Unmodified Vehicle | 82 | 80 | 29 | from which it will be observed that, although the unmodified vehicle coating formulation registered higher leafing values initially and at the end of one month, its leafing value dropped considerably from a high of 82 to 29 percent at the end of one year, whereas the modified vehicle coating formulation exhibited a leafing value of 72 at the end of one year's shelf storage.

EXAMPLE III

A third synthesized organic acid-containing alkyd vehicle was prepared by mixing 50 grams of a 50 percent non-volatile alkyd resin, exhibiting an acid number of 15 and containing 36 percent phthalic anhydride (by weight of non-volatile matter), with 50 grams of mineral spirits, to provide a 25 percent by weight non-volatile vehicle of suitable consistency for admixture with metallic flake pigments in the manufacture of metallic ready-mixed paints.

The vehicle so prepared was divided into two 50 gram portions to one of which was added at room temperature 1.33 milligrams per acid number per gram of non-volatile matter in the synthesized vehicle, or 250 milligrams, of the amine ethylene diamine, and in each portion of the vehicle 4 grams of leafing aluminum flakes were thereafter dispersed to provide an amine-modified and an unmodified metallic ready-mixed paint.

Initial leafing determinations were conducted on both ready-mixed paints before each was sealed in a separate container for shelf storage at room temperature. Additional leafing determinations were also conducted at the end of one and three months' shelf storage.

Table III records the results of the leafing determinations:

*Table III*

| Aluminum Coating Formulation | Percent Leafing | | |
|---|---|---|---|
| | Initial | One Month | Three Months |
| Modified Vehicle | 84 | 47 | 32 |
| Unmodified Vehicle | 40 | 0 | 0 | from which it will be observed that the ready-mixed aluminum paint formulation made with the vehicle modified to include ethylene diamine exhibited a leafing value of 32 percent at the end of three months, whereas the unmodified paint had completely lost its leafing property at the end of one month.

EXAMPLE IV

Another synthesized organic acid-containing alkyd vehicle was formulated by mixing 50 grams of a 50 percent by weight non-volatile alkyd resin exhibiting an acid number of 15 and containing 36 percent phthalic anhydride (by weight of non-volatile matter), with 50 grams of volatile hydrocarbon, such as mineral spirits, to provide a 25 percent by weight non-volatile vehicle suitable for admixture with varying amounts of metallic flake pigments in the manufacture of metallic coating formulations, such as ready-mixed metallically pigmented paints.

The vehicle so synthesized was divided in two 50 gram portions to one of which was added at room temperature 1.07 milligrams per acid number per gram of non-volatile matter in the vehicle, or 200 milligrams, of 1.3 diamino propanol, and 4 grams of leafing aluminum flakes were thereafter dispersed in each portion of the synthesized vehicle to provide an amine-modified and an unmodified metallic aluminum coating formulation.

Both coating formulations were sealed in separate containers and stored at room temperature for more than four months, leafing determinations being conducted on each of the formulations initially, and at the end of one and three months.

Table IV records the results of the leafing determinations:

*Table IV*

| Aluminum Coating Formulation | Percent Leafing | | |
|---|---|---|---|
| | Initial | One Month | Three Months |
| Modified Vehicle | 48 | 46 | 29 |
| Unmodified Vehicle | 40 | 0 | 0 | from which it will be observed that the coating formulation made with unmodified vehicle lost its leaf at the end of one month, as distinguished from a leafing value of 29 percent at the end of three months' storage at room temperature for the coating formulation made with the vehicle modified with 1.3 diamino propanol.

EXAMPLE V

A synthesized 8-gallon esterified natural rosin vehicle containing 50 percent non-volatile matter, and exhibiting an acid number of 17.6, was mixed with 50 grams of mineral spirits to provide a 25 percent by weight non-volatile vehicle of suitable consistency for admixture with metallic flake pigments in the manufacture of commercially acceptable metallic coating formulations, such as paints.

The vehicle thus prepared was divided into two 50 gram portions to one of which was added at room temperature 0.9 milligram per acid number per gram of non-volatile matter in the synthesized vehicle, or 200 milligrams, of the amine tetraethylene pentamine, and in each portion of the vehicle 4 grams of leafing aluminum flakes were thereafter dispersed to provide an amine-modified and an unmodified aluminum coating formulation.

Initial leafing determinations were conducted on both coating formulations before each was separately sealed in containers for shelf storage at room temperature. Additional leafing determinations were also conducted at the end of one month, one year and eighteen months.

Table V records the results of the leafing determinations:

*Table V*

| Aluminum Coating Formulation | Percent Leafing | | | |
|---|---|---|---|---|
| | Initial | One Month | One Year | Eighteen Months |
| Modified Vehicle | 77 | 75 | 84 | 80 |
| Unmodified Vehicle | 88 | 75 | 0 | 0 | from which it will be observed that the ready-mixed aluminum coating formulation made with the vehicle modified to include tetraethylene pentamine exhibited a leafing value of 80 percent at the end of eighteen months, whereas the unmodified paint had lost its leafing property at the end of one year.

EXAMPLE VI

The vehicle of this example was a synthesized organic acid-containing oil-free varnish prepared by mixing 50 grams of a 50 percent non-volatile oil-free resin varnish vehicle, exhibiting an acid number of 7.7, with 50 grams of mineral spirits to provide a 25 percent by weight non-volatile vehicle suitable for admixture with metallic flake pigments in the manufacture of ready-mixed paints.

The vehicle thus prepared was divided into two 50 gram portions to one of which was added at room temperature 2.12 milligrams per acid number per gram of non-volatile matter in the synthesized vehicle, or 200 milligrams, of the amine piperidine, and in each portion of the vehicle 4 grams of leafing aluminum flakes were thereafter dispersed to provide an amine-modified and an unmodified metallic ready-mixed paint formulation.

Initial leafing determinations were conducted on both ready-mixed formulations before each was separately sealed in containers for shelf storage at room temperature. Additional leafing determinations were also conducted at the end of three and six month intervals of sealed storage.

Table VI records the results of the leafing determinations:

*Table VI*

| Aluminum Coating Formulation | Percent Leafing | | |
|---|---|---|---|
| | Initial | Three Months | Six Months |
| Modified Vehicle | 95 | 95 | 95 |
| Unmodified Vehicle | 0 | 0 | 0 | from which it will be observed that the ready-mixed aluminum paint formulations made with the vehicle modified to include piperidine exhibited a leafing of 95 percent throughout its six months' shelf storage at room temperature, whereas the unmodified paint formulation failed to reveal a leafing property at any time.

In addition to the six examples described above, employing synthesized organic acid-containing vehicles, three commercial alkyd type organic acid-containing vehicles were selected and modified, in accordance with the practice of the invention. The three commercial vehicles were identified by their manufacturer as having the compositions and acid numbers, as follows:

VEHICLE NO. 1
Acid No. 12.6

| | Percent |
|---|---|
| Non-volatile alkyd resin | 30 |
| Linseed oil | 56 |
| Phthalic anhydride | 33 |

Remainder volatile solvent.

VEHICLE NO. 2
Acid No. 8.3

| | |
|---|---|
| Non-volatile alkyd resin | 40 |
| Soya oil | 65 |
| Phthalic anhydride | 24 |

Remainder volatile solvent.

VEHICLE NO. 3
Acid No. 15.2

| | |
|---|---|
| Non-volatile alkyd resin | 30 |
| Linseed oil | 52 |
| Phthalic anhydride | 35 |

Remainder volatile solvent.

Tetraethylene pentamine was added to each of the vehicles, Nos. 1, 2 and 3, at room temperature, in the amount of 0.7 milligram per acid number per gram of non-volatile matter in each vehicle, or 265, 230 and 320 milligrams of the amine tetraethylene pentamine were added to 100 gram portions of vehicles Nos. 1, 2 and 3, respectively.

Ready mixed aluminum coating formulations or paints were prepared by dispersing 10 grams of leafing aluminum flakes in each 100 gram portion of the so modified vehicles, as well as in equal portions of unmodified vehicles Nos. 1, 2 and 3, and the six coating formulations thus prepared were sealed in separate containers and shelf stored at room temperature for more than six months, leafing determinations being conducted on each formulation initially, and at the end of one, three and six month intervals.

Table No. VII records the results of the leafing determinations:

*Table VII*

| Aluminum Coating Formulation | Percent Leafing | | | |
|---|---|---|---|---|
| | Initial | One Month | Three Months | Six Months |
| Modified Vehicle No. 1 | 76 | 76 | 72 | 61 |
| Unmodified Vehicle No. 1 | 79 | 72 | 58 | 0 |
| Modified Vehicle No. 2 | 75 | 75 | 68 | 45 |
| Unmodified Vehicle No. 2 | 79 | 37 | 0 | 0 |
| Modified Vehicle No. 3 | 66 | 65 | 55 | 55 |
| Unmodified Vehicle No. 3 | 78 | 42 | 0 | 0 | from which it will be observed that the paint formulations made with the modified commercial vehicles all registered leaf retention at the end of six months' shelf storage and absence of leaf for the paints made with the same unmodified commercial vehicles.

Leafing determinations in all instances were conducted in a manner similar to that described in A.S.T.M. specification D480-51-4.

The leafing aluminum flake content of the coating formulations prepared in accordance with the invention may be varied within conventional ready-mixed paint practice and requirements. Preferably, the leafing aluminum flakes are dispersed in the previously modified, organic acid-containing vehicles in amounts falling within the range two ounces to three pounds of aluminum flakes per gallon of modified vehicle. Also, since the bulk of aluminum pigments are presently manufactured and sold in the form of paste products, regularly produced commercial leafing aluminum paste products comprising by weight 60 to 78 percent aluminum flakes, 1 to 5 percent leafing agent, such as stearic or palmitic acids, or mixtures thereof, and the remainder volatile hydrocarbon, leafing aluminum coating formulations made therewith would preferably include one-eighth to four pounds of the leafing paste per gallon of modified, organic acid-containing vehicle.

Whether the invention is practiced with commercially available or synthesized organic acid-containing vehicles, conventional hydrocarbon volatile solvent thinners, and compatible mixtures thereof, may be substituted or added, as desired. Equivalent thinners in this respect are mineral spirits, xylol, toluol, high flash naphtha and varnish maker's and painter's naphtha, all of which fall under the general classification of volatile hydrocarbons. Also, conventional driers, such as napthenates, octates, and resinates of zirconium, cobalt and manganese may be present in the vehicles and coating formulations made therewith without in any way detracting from the results of the invention.

What is claimed is:

1. A method in the production of leafing aluminum ready-mixed coating formulations in vehicles containing organic acids destructive of the leafing property of leafing aluminum pigment, the steps comprising, adding to the vehicles at room temperature at least one organic acid-reactive amine selected from the group consisting of tetraethylene pentamine, piperidine, ethylene diamine and 1.3 diamino propanol, the said selected amines being destructive in themselves of leafing agent on the surfaces of individual flakes of leafing aluminum pigmentation on direct contact therewith, and thereafter dispersing leafing aluminum flakes in the so-treated vehicles.

2. A method of modifying vehicles containing organic acids destructive of leafing on admixture with leafing aluminum pigmentation in the manufacture of ready-mixed leafing aluminum coating formulations, the steps comprising, adding to the vehicles at room temperature at least one organic acid-reactive amine selected from the group consisting of tetraethylene pentamine, piperidine, ethylene diamine and 1.3 diamino propanol, the said selected amines being destructive in themselves of leafing agent on the surfaces of individual flakes of leafing aluminum pigmentation on direct contact therewith, and allowing the so-treated vehicles to stand for a period of at least thirty minutes.

3. A method of modifying vehicles containing organic acids destructive of leafing on admixture with leafing aluminum pigmentation in the manufacture of ready-mixed leafing aluminum coating formulations characterized by leaf retention following storage of the same, comprising adding to the vehicles at room temperature at least one of the amines selected from the group consisting of tetraethylene pentamine, piperidine, ethylene diamine and 1.3 diamino propanol, the said selected amines being destructive in themselves of leafing agent on the surfaces of individual flakes of leafing aluminum pigmentation on direct contact therewith, and holding the so-treated vehicles for a period of time sufficient to neutralize the organic acids present in the vehicle.

4. A method of modifying vehicles containing organic acids destructive of leafing on admixture with leafing aluminum pigmentation in the manufacture of leaf retaining ready-mixed aluminum coating formulations, said vehicles having acid numbers within the range 5 to 32, comprising adding to the vehicles at room temperature at least one of the amines selected from the group consisting of tetraethylene pentamine, piperidine, ethylene diamine and 1.3 diamino propanol in amounts of 0.3 to 5 milligrams per acid number per gram of non-volatile matter in the vehicles, the said selected amines being destructive in themselves of leafing agent on the surfaces of individual flakes of leafing aluminum pigmentation on direct contact therewith, the total amount of amines not exceeding 5 milligrams per acid number per gram of the non-volatile matter in the vehicles.

5. A method of modifying vehicles containing organic acids destructive of leafing on admixture with leafing aluminum pigmentation in the subsequent manufacture of leaf retaining ready-mixed aluminum coating formulations and said vehicles having acid numbers within the range 5 to 32, the step of adding to the vehicles at room temperature at least one of the amines selected from the group consisting of tetraethylene pentamine, piperidine, ethylene diamine and 1.3 diamino propanol in an amount within the range of 0.3 to 5 milligrams per acid number per gram of non-volatile matter in the vehicles, the said selected amines being destructive in themselves of leafing agent on the surfaces of individual flakes of leafing aluminum pigmentation on direct contact therewith, the total amount of the added amines not exceeding 5 milligrams per acid number per gram of the non-volatile matter in the vehicles.

6. A method of producing a ready-mixed leafing aluminum coating formulation in a synthetic alkyd resin vehicle containing at least one leaf-destructive organic acid, the steps comprising first adding to the vehicle at room temperature at least one of the amines selected from the group consisting of tetraethylene pentamine, piperidine, ethylene diamine and 1.3 diamino propanol in amounts of 0.3 to 5 milligrams per acid number per gram of non-volatile matter in the vehicle, the said selected amines being destructive in themselves of leafing agent on the surfaces of individual flakes of leafing aluminum pigmentation on direct contact therewith allowing the so-treated vehicle to stand at room temperature for at least thirty minutes, and thereafter dispersing leafing aluminum flakes in amounts of two ounces to three pounds per gallon in the so-treated vehicle.

7. A method of producing a ready-mixed leafing aluminum coating formulation in an oleoresinous varnish vehicle containing at least one leaf-destructive organic acid, the steps comprising first adding to the vehicle at room temperature at least one of the amines selected from the group consisting of tetraethylene pentamine, piperidine, ethylene diamine and 1.3 diamino propanol in amounts of 0.3 to 5 milligrams per acid number per gram of non-volatile matter in the vehicle, the said selected amines being destructive in themselves of leafing agent on the surfaces of individual flakes of leafing aluminum pigmentation on direct contact therewith, allowing the so-treated vehicle to stand at room temperature for at least thirty minutes, and thereafter dispersing leafing aluminum flakes in amounts of two ounces to three pounds per gallon in the so-treated vehicle.

8. A method of producing a ready-mixed leafing aluminum coating formulation in an esterified natural rosin vehicle containing at least one leaf-destructive organic acid, the steps comprising first adding to the vehicle at room temperature at least one of the amines selected from the group consisting of tetraethylene pentamine, piperidine, ethylene diamine and 1.3 diamino propanol in amounts of 0.3 to 5 milligrams per acid number per gram of non-volatile matter in the vehicle, the said selected amines being destructive in themselves of leafing agent on the surfaces of individual flakes of leafing aluminum pigmentation on direct contact therewith, allowing the so-treated vehicle to stand at room temperature for at least thirty minutes, and thereafter dispersing leafing aluminum flakes in amounts of two ounces to three pounds per gallon in the so-treated vehicle.

9. A method of producing a ready-mixed leafing aluminum coating formulation in an oil-free varnish vehicle containing at least one leaf-destructive organic acid, the steps comprising first adding to the vehicle at room temperature at least one of the amines selected from the group consisting of tetraethylene pentamine, piperidine, ethylene diamine and 1.3 diamino propanol in amounts of 0.3 to 5 milligrams per acid number per gram of non-volatile matter in the vehicle, the said selected amines being destructive in themselves of leafing agent on the surfaces of individual flakes of leafing aluminum pigmentation on direct contact therewith, allowing the so-treated vehicle to stand at room temperature for at least thirty minutes, and thereafter dispersing leafing aluminum flakes in amounts of two ounces to three pounds per gallon in the so-treated vehicle.

10. A vehicle for admixture with leafing aluminum flakes in the manufacture of a leafing aluminum ready-mixed coating formulation, said vehicle having an acid number within the range 5 to 32 and containing at least one organic leaf-destructive mono- and poly-basic acid of the group benzoic, abietic, phthalic, isophthalic, fumaric, maleic and sebacic, and containing an addition of at least one amine selected from the group consisting of tetraethylene pentamine, piperidine, ethylene diamine and 1.3 diamino propanol in an amount of 0.3 to 5 milligrams per acid number per gram of non-volatile solid matter of the vehicle, the said selected amines being destructive in themselves of leafing agent on the surfaces of individual flakes of leafing aluminum pigmentation on direct contact therewith, the total amount of said added amines not exceeding 5 milligrams per acid number per gram of non-volatile solid matter in the vehicle.

11. A synethetic alkyd resin vehicle for admixture with leafing aluminum flakes in the manufacture of a leafing aluminum ready-mixed coating formulation, said synthetic alkyd resin vehicle containing at least one organic leaf-destructive acid within the acid number range 5 to 32 and containing an addition of at least one amine selected from the group consisting of tetraethylene pentamine, piperidine, ethylene diamine and 1.3 diamino propanol in an amount of 0.3 to 5 milligrams per acid number per gram of non-volatile content of the synthetic alkyd resin vehicle, the said selected amines being destructive in themselves of leafing agent on the surfaces of individual flakes of leafing aluminum pigmentation on direct contact therewith, the total amount of said added amines not exceeding 5 milligrams per acid number per gram of non-volatile content of the vehicle.

12. An oleoresinous varnish vehicle for admixture with leafing aluminum flakes in the manufacture of a leafing aluminum ready-mixed coating formulation, said oleoresinous varnish vehicle containing at least one organic leaf-destructive acid within the acid number range 5 to 32 and containing an addition of at least one amine selected from the group consisting of tetraethylene pentamine, piperidine, ethylene diamine and 1.3 diamino propanol in an amount of 0.3 to 5 milligrams per acid number per gram of non-volatile content of the oleoresinous varnish vehicle, the said selected amines being destructive in themselves of leafing agent on the surfaces of individual flakes of leafing aluminum pigmentation on direct contact therewith the total amount of said added amines not exceeding 5 milligrams per acid number per gram of non-volatile content of the vehicle.

13. A natural rosin vehicle for admixture with leafing aluminum flakes in the manufacture of a leafing aluminum ready-mixed coating formulation, said natural rosin vehicle containing at least one organic leaf-destructive acid within the acid number range 5 to 32 and containing an addition of at least one amine selected from the group consisting of tetraethylene pentamine, piperidine, ethylene diamine and 1.3 diamino propanol in an amount of 0.3 to 5 milligrams per acid number per gram of non-volatile content of the natural rosin vehicle, the said selected amines being destructive in themselves of leafing agent on the surfaces of individual flakes of leafing aluminum pigmentation on direct contact therewith, the total amount of said added amines not exceeding 5 milligrams per acid number per gram of non-volatile content of the vehicle.

14. An oil-free varnish vehicle for admixture with leafing aluminum flakes in the manufacture of a leafing aluminum ready-mixed coating formulation, said oil-free varnish vehicle containing at least one free organic leaf-destructive acid within the acid number range 5 to 32 and containing an addition of at least one amine selected from the group consisting of tetraethylene pentamine, piperidine, ethylene diamine and 1.3 diamino propanol in an amount of 0.3 to 5 milligrams per acid number per gram of non-volatile content of the oil-free varnish vehicle, the said selected amines being destructive in themselves of leafing agent on the surfaces of individual flakes of leafing aluminum pigmentation on direct contact therewith, the total amount of said added amines not exceeding 5 milligrams per acid number per gram of non-volatile content of the vehicle.

15. A leafing aluminum ready-mixed coating formulation consisting essentially of a pretreated vehicle containing at least one organic acid destructive of the leafing property of the aluminum pigment and at least one added amine selected from the group consisting of tetraethylene pentamine, piperidine, ethylene diamine and 1.3 diamino propanol in amounts within the range 0.3 to 5 milligrams per acid number per gram of non-volatile matter in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

16. A leafing aluminum ready-mixed coating formulation consisting essentially of a pretreated vehicle containing at least one organic acid destructive of leafing of aluminum pigmentation and having an acid number of 5 to 32 and containing at least one added amine selected from the group consisting of tetraethylene pentamine, piperidine, ethylene diamine and 1.3 diamino propanol in amounts within the range 0.3 to 5 milligrams per acid number per gram of non-volatile solids in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

17. A leafing aluminum ready-mixed coating formulation consisting essentially of a pretreated synthetic alkyd resin vehicle containing at least one organic acid destructive of leafing of aluminum pigmentation and having an acid number of 5 to 32 and containing at least one added amine selected from the group consisting of tetraethylene pentamine, piperidine, ethylene diamine and 1.3 diamino propanol in amounts within the range 0.3 to 5 milligrams per acid number per gram of non-volatile solids in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

18. A leafing aluminum ready-mixed coating formulation consisting essentially of a pretreated oleoresinous vehicle containing at least one organic acid destructive of the leafing property of the aluminum pigmentation and having an acid number of 5 to 32 and containing at least one added amine selected from the group consisting of tetraethylene pentamine, piperidine, ethylene diamine and 1.3 diamino propanol in amounts within the range 0.3 to 5 milligrams per acid number per gram of non-volatile matter in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

19. A leafing aluminum ready-mixed coating formulation consisting essentially of a pretreated natural rosin vehicle containing at least one organic acid destructive of leafing of the aluminum pigmentation and having an acid number of 5 to 32 and containing at least one added amine selected from the group consisting of tetraethylene pentamine, piperidine, ethylene diamine and 1.3 diamino propanol in amounts within the range 0.3 to 5 milligrams per acid number per gram of non-volatile matter in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

20. A leafing aluminum ready-mixed coating formulation consisting essentially of a pretreated oil-free varnish vehicle containing at least one organic acid destructive of leafing of aluminum pigmentation and having an acid number of 5 to 32 and containing at least one added amine selected from the group consisting of tetraethylene pentamine, piperidine, ethylene diamine and 1.3 diamino propanol in amounts within the range 0.3 to 5 milligrams per acid number per gram of non-volatile matter in the vehicle, but not exceeding 5 milligrams per acid number per gram of the non-volatile matter in the vehicle in total amount, the said selected amines being destructive in themselves of leafing agent on the surfaces of individual flakes of leafing aluminum pigmentation on direct contact therewith, in admixture with leafing aluminum flakes in amounts within the range two ounces to three pounds per gallon of the pretreated vehicle.

References Cited in the file of this patent

UNITED STATES PATENTS

| | | |
|---|---|---|
| 2,178,181 | McMahon | Oct. 31, 1939 |
| 2,234,164 | Harris | Mar. 11, 1944 |
| 2,522,538 | Rethwisch et al. | Sept. 19, 1950 |
| 2,587,267 | Wray et al | Feb. 26, 1952 |
| 2,904,525 | Babcock et al. | Sept. 15, 1959 |

FOREIGN PATENTS

| | | |
|---|---|---|
| 483,814 | Great Britain | Apr. 22, 1938 |
| 665,709 | Great Britain | Jan. 30, 1952 |